United States Patent [19]
Cicognani

[11] 3,937,094
[45] Feb. 10, 1976

[54] TOOTHED BELT
[75] Inventor: Mario Cicognani, Milan, Italy
[73] Assignee: Industrie Pirelli S.p.A., Milan, Italy
[22] Filed: Jan. 2, 1974
[21] Appl. No.: 429,812

[30] Foreign Application Priority Data
Dec. 29, 1972 Italy .................................. 33879/72
Jan. 26, 1973 Italy .................................. 19643/73

[52] U.S. Cl. ............................................... 74/231 C
[51] Int. Cl.² ............................................... F16G 1/28
[58] Field of Search ...... 74/231 C, 231 M, 237, 449

[56] References Cited
UNITED STATES PATENTS
1,394,127 10/1921 Stone .................................... 74/449
3,621,727 11/1971 Cicognani .......................... 74/231 C FOREIGN PATENTS OR APPLICATIONS
661,591 10/1936 Germany ........................... 74/231 M Primary Examiner—Leonard H. Gerin
Attorney, Agent, or Firm—Stevens, Davis, Miller & Mosher

[57] ABSTRACT

A reinforced plastic or elastomeric drive belt having tooth-like protuberances for meshing with the teeth of a pulley is provided with a fabric covering over the toothed surface which is more rigid and more resistant to flection stresses than the body of the belt.

8 Claims, 4 Drawing Figures

TOOTHED BELT

The present invention concerns a toothed belt, namely a belt provided with teeth on at least one of its faces, by means of which it engages with at least two toothed pulleys in order to constitute a kinematic system for the transmission of motion.

In said kinematic system the transmission of motion is carried out by meshing of the teeth of the belt with the teeth of the pulleys.

During said meshing, stresses take place on the belt's teeth and on the pulleys' teeth.

Whilst the pulleys' teeth are made of metallic material and are therefore able to withstand satisfactorily the effects of abrasion and of the mechanical stresses to which they are subjected, the belt's teeth, being made of elastomeric or plastic material, have a resistance by far lesser in respect of said effects. It follows that the kinematic system for the transmission of motion between the toothed belt and the toothed pulleys becomes inoperative both for the abrasion which wears the belt's teeth and for the rupture of the same, which usually takes place at the base of the tooth.

Another typical phenomenon of the transmission of motion between a toothed belt and toothed pulleys, which does not occur in the transmission between metallic gears and in the couplings between metallic racks and metallic toothed wheels, is that of the so-called "skipping" of the tooth.

This phenomenon consists in the fact that sometimes, especially under high loads, the teeth of the toothed belt, owing to their deformability, pass over the teeth of the toothed pulleys.

In order to improve the resistance of the teeth of a toothed belt to the two effects which originate their unserviceability, and in order to increase at the most the resistance of the belt's teeth to the skipping phenomenon, various solutions have been studied and experimented according to different courses. A course followed to improve the resistance of the teeth of a belt to mechanical stresses and wear and to prevent the skipping phenomenon is that of providing a resistant structure inside the teeth.

Said resistant structure for the teeth is constituted by fibers dispersed in the elastomeric or plastic material forming the tooth, or by like structures.

Another course, followed for the same purpose, is that of providing a particular profile of the teeth by trying, through a compromise, to obtain a profile which, exploiting the deformability of the tooth, may give rise to the smallest possible sliding (resistance to wear) and at the same time may confer to the tooth the greatest possible sturdiness (resistance to mechanical stresses and reduction of the skipping phenomenon), all this, of course, in such a way as to maintain a correct meshing between the toothed belt and the toothed pulleys.

This solution has originated a wide range of teeth' profiles.

All the solutions already known have permitted to increase the useful life of a toothed belt; said improvements, however, are not relevant, being they depending on the need of resorting to compromises.

The present invention aims at prolonging the useful life of a belt and to improve the belt behaviour in a substantial way in respect of the skipping phenomenon.

Accordingly, the object of the present invention is a toothed belt comprising a body constituted by a ring of elastomeric or plastic material containing a resistant insertion, at least a toothing of elastomeric or plastic material at one face of the belt body, and a covering for the teeth and the grooves between them, characterized in that said covering is constituted by an extremely rigid layer, practically indeformable by flexion stresses, in comparison with the elastomeric or plastic material forming the teeth.

The present invention will be better understood from the following detailed description, made by way of non-limiting example with reference to the figures of the attached sheet of drawing, in which:

FIG. 1 illustrates a portion of a toothed belt. Said belt comprises a body 1 of elastomeric or plastic material of a type known per se to those skilled in this field, in which is embedded a resistant structure formed by a plurality of cords 2, parallel and coplanar to one another, made of an inextensible material of a type already known to the technician of this field.

A toothing formed by teeth 3 is present on one of the two faces of the belt body; said toothing is made of elastomeric or plastic material of a type known per se to the technicians of this field, and the teeth are separated from one another by means of grooves 4.

Figure 1:
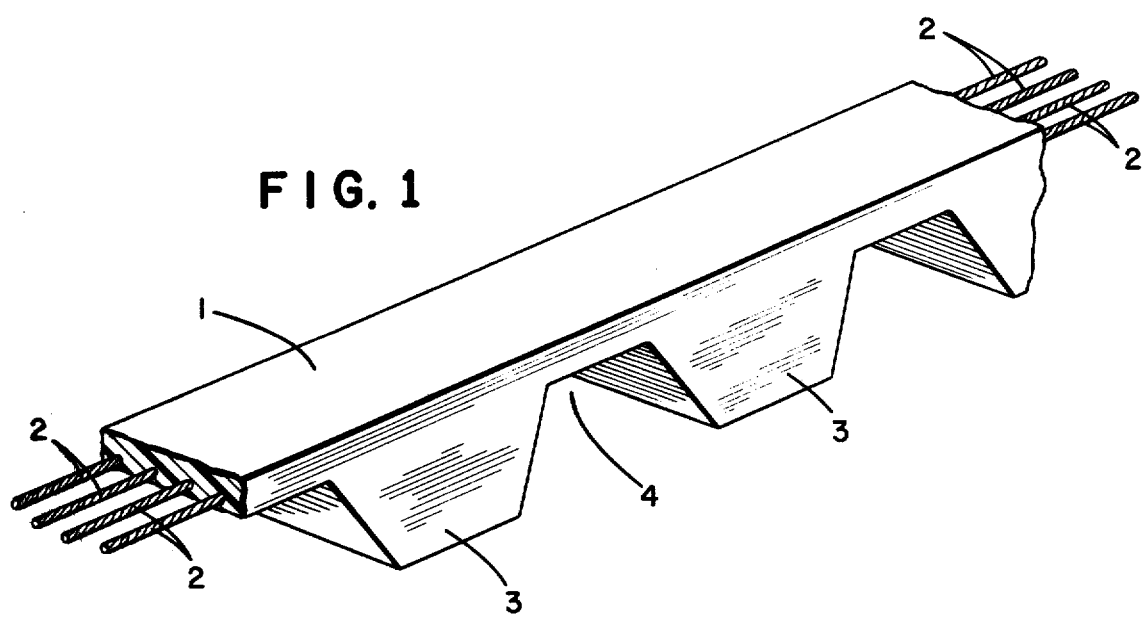
FIG. 1 represents in perspective view a portion of a toothed belt.
Figure 2:
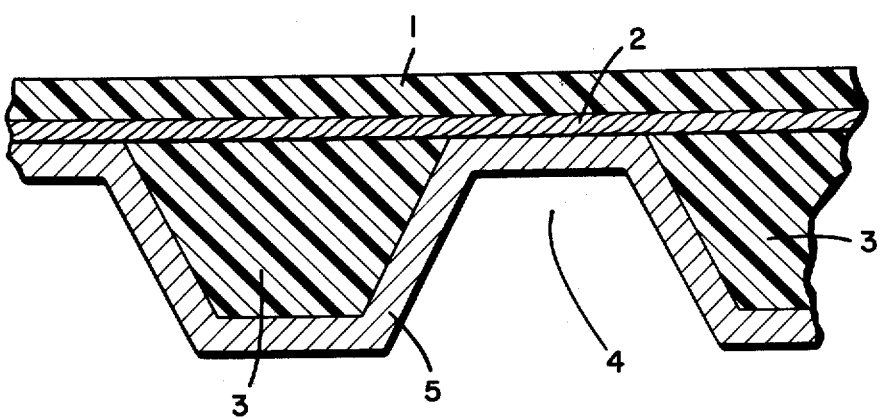
FIG. 2 represents in section a tooth of a toothed belt.

A covering layer 5 is present on the surface of the teeth 3 and of the grooves 4, as shown in FIG. 2.

For the purposes of the present invention, the feature of the layer 5, covering the teeth and the grooves of the toothed belt, is that of being rigid and consequently practically indeformable under flexion stresses in comparison with the elastomeric material forming the belt teeth.

This rigidity and indeformability of layer 5 covering the teeth and the grooves of the belt can be obtained in various ways.

One way to obtain the rigidity and the indeformability to flexion of layer 5 is a structure, embedded in elastomeric or plastic material, which is extremely rigid under flexion stresses.

Structures of this kind could be devised in large number and any technician would be able to carry out them.

Figure 3:
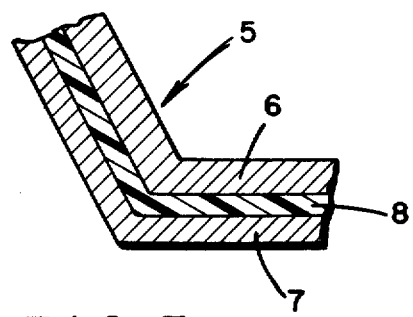
FIG. 3 represents a particular of a covering for the teeth and the grooves of the belt.

Among said structures (see FIG. 3), those constituted by at least two square-woven fabrics 6 and 7, doubled together with the interposition of a layer 8 of elastomeric material, appear particularly advantageous to the effect of their construction and application to the surface of the toothing of a belt.

A structure of the above described type is also that formed by directly joining two rubberized square-woven fabrics, since the small layers of elastomeric material existing on the faces of the rubberized fabrics in contact with each other constitute in their whole a layer of elastomeric material.

A structure of this kind is extremely rigid and substantially indeformable under flexion stresses.

In fact, if such a structure is subjected to flexion stresses and the diagram of the stresses is considered in ay of its sections, it can be seen that the fabrics are stressed for a value by far higher than that to which they would be stressed if the diagram of the stresses were linear, whilst the elastomeric or plastic material is not practically stressed.

In conclusion, the fabrics withstand by themselves the whole load, whilst the elastomeric or plastic material interposed between them acts only as a connection and separation element between them.

Since the fabrics are highly stressed, they are very stiff and therefore of scarce deformability, as it can be understood by observing any stress/deformation diagram of a fabric; consequently the whole structure of which the fabrics make part is very stiff and scarcely deformable in comparison with the elastomeric or plastic material forming the teeth.

The above considerations are valid in general, whichever is the type of fabric used for layers 6 and 7.

However, if use is made of particular types of fabrics for layers 6 and 7, the rigidity of the structure can be further increased.

For instance, with equal materials forming the fabric layers 6 and 7, if the warp threads of the latter are arranged along the layout of the belt, the structure is much more rigid than in the case in which the warp threads have other arrangements.

Moreover the fabrics constituting layers 6 and 7 can be different and can have different characteristics.

For instance, fabric 7 applied on the outer face of the belt can conveniently be a fabric having high features of resistance to abrasion, whilst fabric 6 can conveniently be a fabric having a high resistance to compression, tear and shearing stresses.

In particular, fabric 7 can be a self-lubricating fabric according to the U.S. Pat. No. 3,621,727, and fabric 6 can be the following square-woven fabric:

| Material | | high tenacity staple rayon |
|---|---|---|
| count | | 12/3 |
| warp: | threads per dm | 180 |
| | tensile strength (Kg/5 cm) | 240 |
| | ultimate elongation % | 40 |
| weft: | threads per dm | 140 |
| | tensile strength (Kg/5 cm) | 220 |
| | ultimate elongation % | 20 |

This fabric can moreover be treated with latex adhesives of a type known per se to the technicians of this field, for instance with an adhesive of the vinylpyridine type having a high resin content, in order to obtain a perfect bonding to the elastomeric material forming the teeth of the belt and to stiffen the fabric so as to further increase the rigidity of the covering of the teeth.

In particular, from experimental tests, it has been found that the most appropriate compound to confer the best rigidity and indeformability to fabric 6 is a neoprene compound containing isocyanate.

More particularly, a solution in which the components have the following percentages by weight on the solution has proved particularly convenient for rubberizing fabric 5:

| Solvent | 75% |
|---|---|
| Isocyanate | 15% |
| Neoprene compound | 10% | in which the solvent is a toluene-base one and the neoprene compound has the following composition, expressed as a weight percentage:

| Neoprene | 45% |
|---|---|
| Zinc oxide | 4.5% |
| Magnesium oxide | 4.3% |
| Mineral oil | 6.2% |
| Carbon black | 40% |

If desired, instead of the above indicated compound, a compound can be used which is still based on neoprene but is not black, in order to indicate when fabric 7 is partially worn out and to be therefore informed of the need of replacing the belt.

The stiffening of the covering layer for the teeth, and therefore the indeformability of said covering under flexion stresses, prevent the deformation of the whole tooth.

Figure 4:
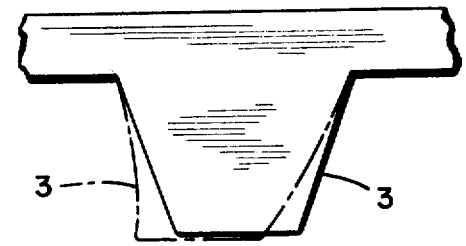
FIG. 4 represents the deformation of a tooth in a toothed belt of conventional type.

In other words, as represented in FIG. 4, exaggerating the phenomenon for a better understanding, tooth 3 under load maintains the form it had in unloaded condition and which is represented with a continuous line whilst, if the outer covering were not stiffened, said tooth would deform, taking the shape indicated with dotted line.

By virtue of the indeformability of the covering of the teeth in a toothed belt it is possible to obtain a considerable increase in the useful life of said toothed belt and to improve its resistance to the skipping phenomenon.

Experimental tests carried out on toothed belts according to the invention have demonstrated that an increase of useful life of over 100% with respect to the known toothed belts, in particular in severe service conditions, has been reached.

As regards the skipping phenomenon, from experimental tests carried out on the two types of belt, the characteristics of the belts, the transmission system and the assembling conditions being the same, an improvement of 15%–20% and over can be noted if the neoprene compound containing isocyanate is used for rubberizing the inner fabric.

Such an exceptional increase in the belt life, obtained by using a rigid and indeformable covering for the teeth, is probably due to the combination of several factors which do not interfere with one another and which therefore do not involve the need of resorting to compromises.

The outer surface of the teeth may have the only task of withstanding abrasion, so that, for this purpose, the most appropriate materials can be employed without taking into account other requirements.

The reinforcing structure of the covering layer for the teeth has the only task of withstanding mechanical stresses, so that for said task the most appropriate materials and arrangements can be adapted without taking into account other requirements.

The rigidity of the covering layer cooperates in reducing the dynamic stresses in the teeth themselves.

Moreover, owing to the rigidity of the covering for the teeth, the deformations of the latter are reduced and consequently the elastomeric material of which they are formed is less stressed in the meaning that, as the elastic hysteresis of the material forming the teeth is small, the heat generation is irrelevant, so that the degradation of the elastomeric material is eliminated and the duration of the latter is increased.

As regards the advantages regarding the increase of resistance to the skipping phenomenon, the explanation could be that, being the tooth less deformable, owing to the rigidity of its outer covering, it is more unlikely for the indicated phenomenon to happen.

In fact, as regards the improved resistance to the skipping phenomenon, which is a consequence and a demonstration (since a more rigid and indeformable covering of the tooth means also a more rigid and indeformable tooth) of the high rigidity and indeformability of the covering of a belt according to the present invention, the experimental tests carried out on toothed belts according to the invention in comparison with conventional belts where the elastomeric material forming the tooth is the same and has a hardness of 80 Shore A, have given the results reported in the following table:

| T | A | B |
|---|---|---|
| 10 | 7.1 | 8.2 |
| 20 | 8 | 9.2 |
| 30 | 8.4 | 9.9 |
| 40 | 8.6 | 10.5 |
| 50 | 8.8 | 10.9 | where T is the tension applied to the belt,

A is the value, given in kgm, of the torque originating the skipping of the tooth in a conventional belt, and B is the value, given in kgm, of the torque originating the skipping of the tooth in a belt according to the present invention.

Although particular embodiments of the invention have been illustrated and described, it is understood that the invention includes in its scope any other alternative embodiment accessible to a technician of this field.

I claim:

1. A toothed belt comprising an elastomeric or plastic continuous band, a reinforcing structure embedded in said band, a toothing on at least one face of the band and a covering for the toothing, characterized in that said covering is constituted by at least two layers of fabric doubled together with a layer of elastomeric or plastic material interposed therebetween, whereby said covering is an extremely rigid layer which is substantially non-deformable by flexion stresses in comparison with the elastomeric or plastic material forming the toothing.

2. A toothed belt as in claim 1, characterized in that the outer fabric is a fabric resistant to abrasion and the inner fabric is a fabric resistant to compression, tear and shearing stresses.

3. A toothed belt as in claim 2, characterized in that the outer fabric is a self-lubricating fabric.

4. A toothed belt as in claim 2, characterized in that the inner fabric is a square-woven fabric of high tenacity staple rayon having a count of 12/3, in which the warp has 180 threads per dm, a tensile strength of 240 kg/5 cm and an ultimate elongation of 40% and the weft has 140 threads per dm, a tensile strength of 220 kg/5 cm and an ultimate elongation of 20%.

5. A toothed blet as in claim 1, characterized in that the inner fabric is rubberized with a polychloroprene rubber containing an isocyanate.

6. A toothed belt as in claim 5, characterized in that the rubberizing of the layer of inner fabric is carried out with a solution comprising, in weight percentage of the solution, 75% of solvent, 15% of isocyanate and 10% of polychloroprene rubber.

7. A toothed belt as in claim 6, characterized in that the solvent is a toluene-base one.

8. A toothed belt as in claim 6, characterized in that the polychloroprene rubber has the following composition, expressed as a percentage by weight of the compound:

| Polychloroprene | 45% |
|---|---|
| Zinc oxide | 4.5% |
| Magnesium oxide | 4.3% |
| Mineral oil | 6.2% |
| Carbon black | 40%. |

* * * * *